(12) United States Patent
Borgeat et al.

(10) Patent No.: US 9,764,862 B2
(45) Date of Patent: Sep. 19, 2017

(54) MACHINE FOR AUTOMATICALLY FILLING-INFLATING GAS CUSHIONS, NOTABLY AIR CUSHIONS, FOR PACKAGING AND USE THEREOF FOR FILLING AND INFLATING CUSHIONS

(76) Inventors: Guy Borgeat, Vouvry (CH); Glenn Flueckiger, Sion (CH)

(*) Notice: Subject to any disclaimer, the term of this patent is extended or adjusted under 35 U.S.C. 154(b) by 689 days.

(21) Appl. No.: 13/879,672

(22) PCT Filed: Oct. 21, 2011

(86) PCT No.: PCT/CH2011/000253
§ 371 (c)(1),
(2), (4) Date: Apr. 16, 2013

(87) PCT Pub. No.: WO2012/055053
PCT Pub. Date: May 3, 2012

(65) Prior Publication Data
US 2013/0212978 A1    Aug. 22, 2013

(30) Foreign Application Priority Data
Oct. 25, 2010   (CH) ..................... 1757/10

(51) Int. Cl.
| | | |
|---|---|---|
| B65B 1/04 | (2006.01) | |
| B29C 65/00 | (2006.01) | |
| B31D 5/00 | (2017.01) | |

(52) U.S. Cl.
CPC ............ B65B 1/04 (2013.01); B29C 66/4312 (2013.01); B31D 5/0073 (2013.01)

(58) Field of Classification Search
CPC .. B31D 5/0039; B31D 5/0065; B31D 5/0073; B31D 5/0069; B31D 5/0086;
(Continued)

(56) References Cited

U.S. PATENT DOCUMENTS 3,389,643 A * 6/1968 Lemcke ................. B29C 65/18
                                                156/513
3,425,887 A * 2/1969 Bowen .................... B29C 65/18
                                                156/518
(Continued)

FOREIGN PATENT DOCUMENTS

CN   101472729 A   7/2009
CN   101723136 A   6/2010
(Continued)

OTHER PUBLICATIONS

International Search Report for PCT/CH2011/000253, mailed Apr. 12, 2012; ISA/EP.

Primary Examiner — Gloria R Weeks
Assistant Examiner — Lucas Palmer
(74) Attorney, Agent, or Firm — Brooks Kushman P.C.

(57) ABSTRACT

A machine for automatically inflating air cushions. The cushions have two plastic walls (21; 22) joined together around their periphery to define a closed space. The machine comprises a source of gas under pressure, and two jaws (1; 2) arranged such that they can move on a supporting structure. Each one of the jaws consists of a body (1; 3) each having a plane face (4;10) of substantially the same shape and surface area, it being possible for the faces to mate against one another in order to clamp between them the walls (21; 22) of a cushion. Each jaw comprises an aspiration channel (6; 7) opening onto its planer face. A first jaw on the inside of its body has a hollow needle (5) able to move relative to the body and capable in a certain position of having its pointed tip outside of the surface of the plane face. A second jaw within its body has a heating element (18) capable, when the two jaws are clamping between them the two walls of a cushion, of heat-welding the two walls together over a certain proportion of their contacting surface.

6 Claims, 5 Drawing Sheets

(58) Field of Classification Search
CPC .............. B29C 66/814; B29C 66/2422; B29C 66/24221; B29C 66/2442; B29C 66/4312
USPC ......... 156/583.4, 553, 581, 583.1, 269, 292, 156/308.4, 290
See application file for complete search history.

(56) References Cited

U.S. PATENT DOCUMENTS

| | | | | |
|---|---|---|---|---|
| 3,540,186 A * | 11/1970 | Parvin | ................... | B65B 7/162 53/329.4 |
| 3,750,365 A * | 8/1973 | Darby, Jr. | ............... | B65B 43/26 53/385.1 |
| 3,773,235 A * | 11/1973 | Canamero | ............... | B65B 9/042 226/112 |
| 3,874,976 A * | 4/1975 | MacFarland, Jr. | .. | B29C 65/7451 156/251 |
| 3,909,340 A * | 9/1975 | Solbeck | ................... | B29C 65/02 156/244.11 |
| 3,938,298 A * | 2/1976 | Luhman | .............. | B29C 49/0047 156/147 |
| 4,017,351 A * | 4/1977 | Larson | ................ | B29C 49/0047 156/145 |
| 4,049,854 A * | 9/1977 | Casey | ..................... | B29C 65/18 156/147 |
| 4,366,663 A * | 1/1983 | Grebe | ................... | B29C 51/261 425/121 |
| 4,620,895 A * | 11/1986 | Kato | ....................... | B29C 53/04 156/204 |
| 4,714,506 A * | 12/1987 | Yamashiro | ........... | B31D 5/0073 156/145 |
| 5,094,707 A * | 3/1992 | Bruno | ................. | B29C 66/4322 156/244.15 |
| 5,216,868 A * | 6/1993 | Cooper | .................. | B65B 61/06 53/472 |
| 5,335,483 A * | 8/1994 | Gavronsky | ........... | B29C 44/182 53/451 |
| 5,337,541 A * | 8/1994 | Gmuer | .................. | B65B 43/30 53/386.1 |
| 5,337,542 A * | 8/1994 | Omori | .................... | B65B 9/067 53/374.5 |
| 5,552,003 A * | 9/1996 | Hoover | ................. | B29C 66/439 156/147 |
| 5,693,163 A * | 12/1997 | Hoover | ................. | B29C 66/439 156/147 |
| 5,873,215 A * | 2/1999 | Aquarius | ............ | B29C 49/0047 53/403 |
| 5,942,076 A * | 8/1999 | Salerno | ................ | B31D 5/0073 156/147 |
| 6,044,628 A * | 4/2000 | Katayama | ........... | B29C 65/3656 53/552 |
| 6,170,227 B1 * | 1/2001 | Kovacs | ................ | B31D 5/0073 53/375.9 |
| 6,260,336 B1 * | 7/2001 | Motomura | .......... | B29C 65/3656 53/551 |
| 6,276,532 B1 * | 8/2001 | Sperry | .................. | B29C 65/342 206/522 |
| 6,508,901 B2 * | 1/2003 | Miller | ................... | B29C 65/02 156/227 |
| 6,536,183 B1 * | 3/2003 | Brown | ................... | B65G 51/03 53/250 |
| 6,569,283 B1 * | 5/2003 | Sperry | .................. | B29C 65/342 156/580 |
| 6,758,026 B2 * | 7/2004 | Davey | ..................... | B65B 9/13 53/403 |
| 6,789,376 B1 * | 9/2004 | Greenwood | ......... | B31D 5/0073 53/468 |
| 6,889,739 B2 * | 5/2005 | Lerner | ................... | B29C 65/18 156/145 |
| 6,955,846 B2 * | 10/2005 | Lerner | ................... | B29C 65/18 428/166 |
| 7,067,025 B2 * | 6/2006 | Borgeat | ................ | B31D 5/0073 156/285 |
| 7,089,714 B2 * | 8/2006 | Thomas | ................ | B31D 5/0073 53/374.8 |
| 7,240,468 B2 * | 7/2007 | Tanaka | .................. | B31D 5/0073 53/115 |
| 7,325,377 B2 * | 2/2008 | Fuss | ...................... | B31D 5/0073 53/403 |
| 7,429,304 B2 * | 9/2008 | McNamara, Jr. | .... | B31D 5/0073 156/145 |
| 7,444,795 B2 * | 11/2008 | Yasuhira | ............... | B65B 43/465 53/133.2 |
| 8,181,428 B2 * | 5/2012 | Gustafsson | ............. | B65B 61/14 53/134.1 |
| 8,745,960 B2 * | 6/2014 | Kannankeril | ........ | B31D 5/0073 53/284.7 |
| 2004/0200561 A1 | 10/2004 | Lerner et al. | | |
| 2005/0077004 A1 * | 4/2005 | Borgeat | ................ | B31D 5/0073 156/285 |
| 2006/0042189 A1 * | 3/2006 | Oswald | .................... | B65B 43/30 53/403 |
| 2006/0090421 A1 * | 5/2006 | Sperry | .................... | B29C 65/02 53/403 |
| 2006/0229180 A1 * | 10/2006 | Hashimoto | ........... | B65B 51/306 493/287 |
| 2006/0292320 A1 * | 12/2006 | Greenwood | ............. | B29C 65/18 428/34.1 |
| 2007/0068118 A1 * | 3/2007 | Forss | ................... | B65D 75/563 53/403 |
| 2008/0014389 A1 * | 1/2008 | Wehrmann | ........... | B31D 5/0073 428/35.2 |
| 2008/0066852 A1 * | 3/2008 | Wetsch | ................ | B29C 65/18 156/147 |
| 2009/0217626 A1 * | 9/2009 | Kemp | ....................... | A61L 2/07 53/407 |
| 2009/0313956 A1 * | 12/2009 | Sampedro | ............. | B29C 51/082 53/559 |
| 2010/0050571 A1 * | 3/2010 | Birkle | .................. | B31D 5/0073 53/266.1 |
| 2010/0251668 A1 * | 10/2010 | Sperry | ................. | B31D 5/0073 53/403 |
| 2011/0024055 A1 * | 2/2011 | Chiang | .................. | B29C 65/222 156/497 |
| 2011/0048634 A1 * | 3/2011 | Kim | ........................ | B29C 65/18 156/285 |
| 2011/0172072 A1 * | 7/2011 | Wetsch | ................. | B31D 5/0073 493/227 |
| 2011/0247725 A1 * | 10/2011 | Frayne | ................. | B31D 5/0073 141/10 |
| 2012/0231940 A1 * | 9/2012 | Tan | ...................... | B31D 5/0073 493/186 |
| 2014/0260094 A1 * | 9/2014 | Wehrmann | .............. | B65B 55/00 53/403 |
| 2016/0235212 A1 * | 8/2016 | Krtek | ...................... | A47C 27/064 |

FOREIGN PATENT DOCUMENTS

| | | | | |
|---|---|---|---|---|
| EP | 0553027 A1 | 7/1993 | | |
| FR | EP 0553027 A1 * | 7/1993 | ........... | B65D 81/052 |
| JP | WO 9535246 A1 * | 12/1995 | ........... | B31D 5/0073 |
| JP | WO 9713636 A1 * | 4/1997 | ........ | B29C 49/0047 |
| WO | WO-95/35246 A1 | 12/1995 | | |
| WO | 9961232 A1 | 12/1999 | | |
| WO | WO 0214156 A1 * | 2/2002 | ........... | B31D 5/0073 |

* cited by examiner

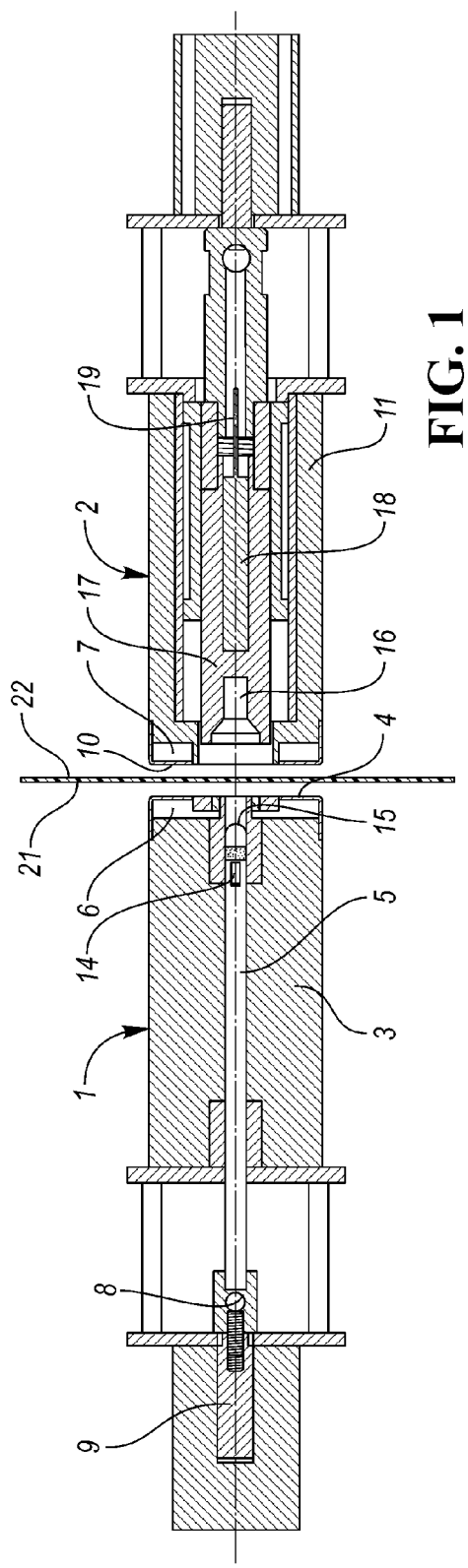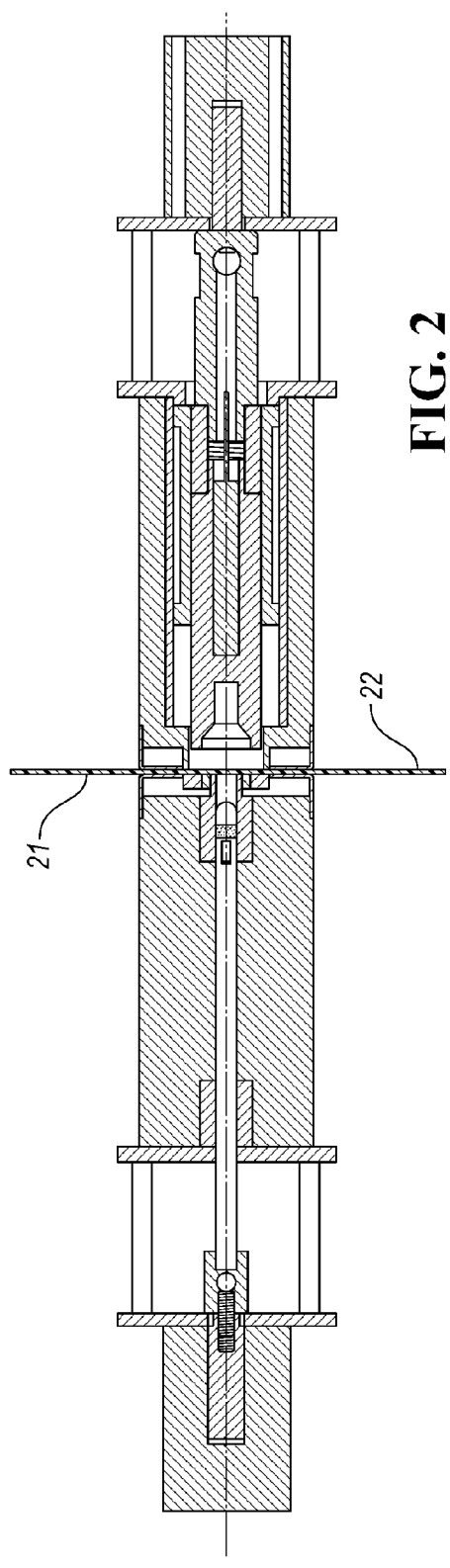

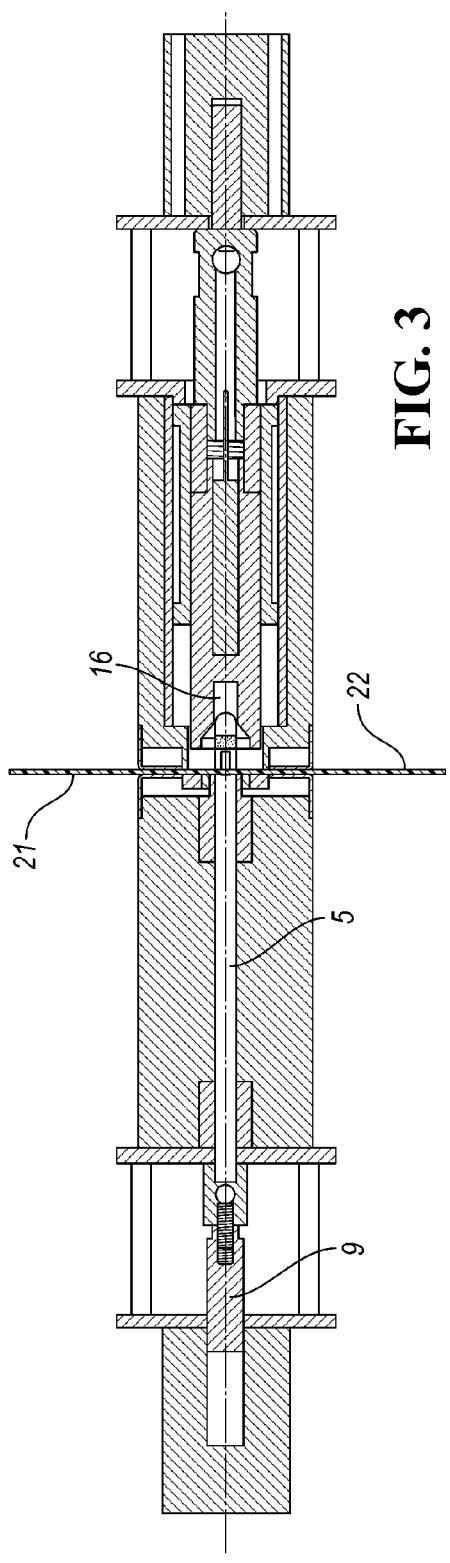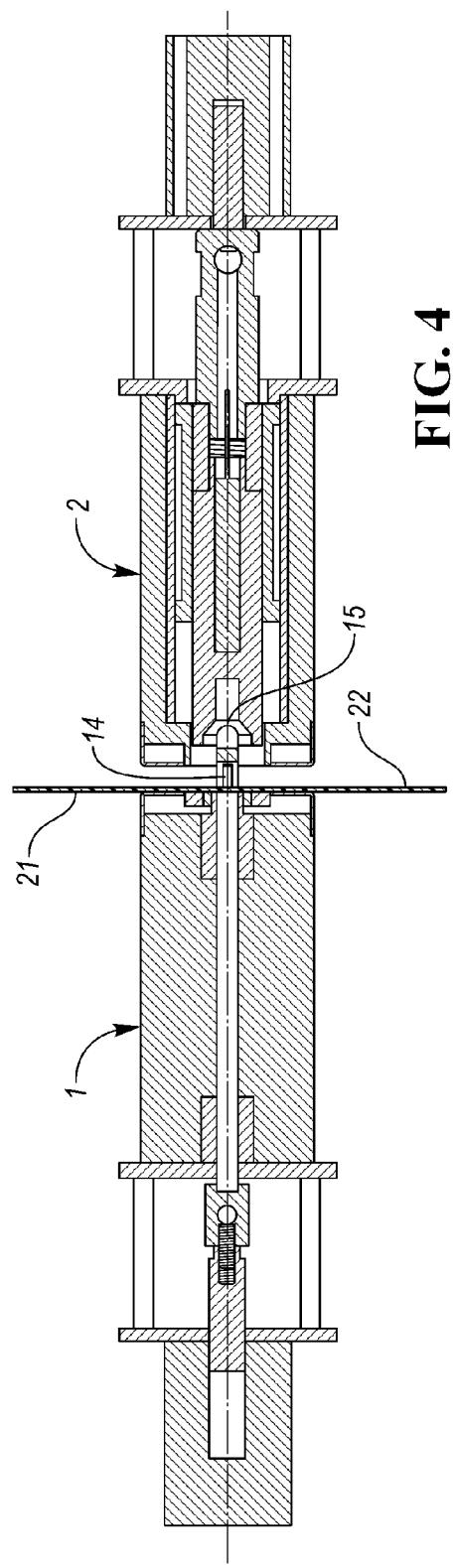

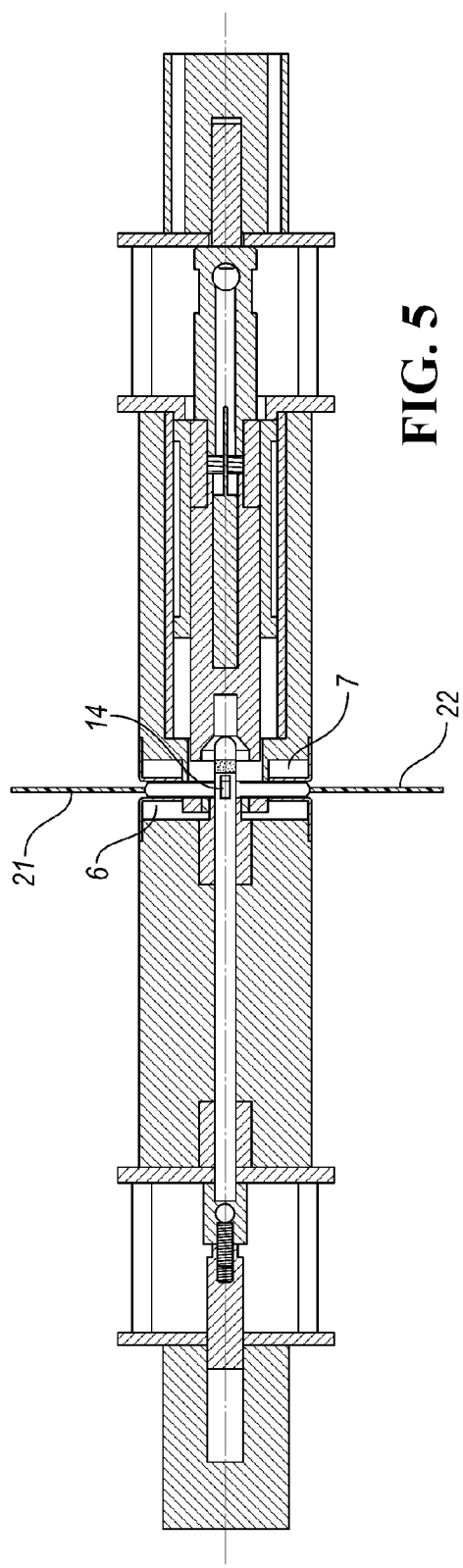
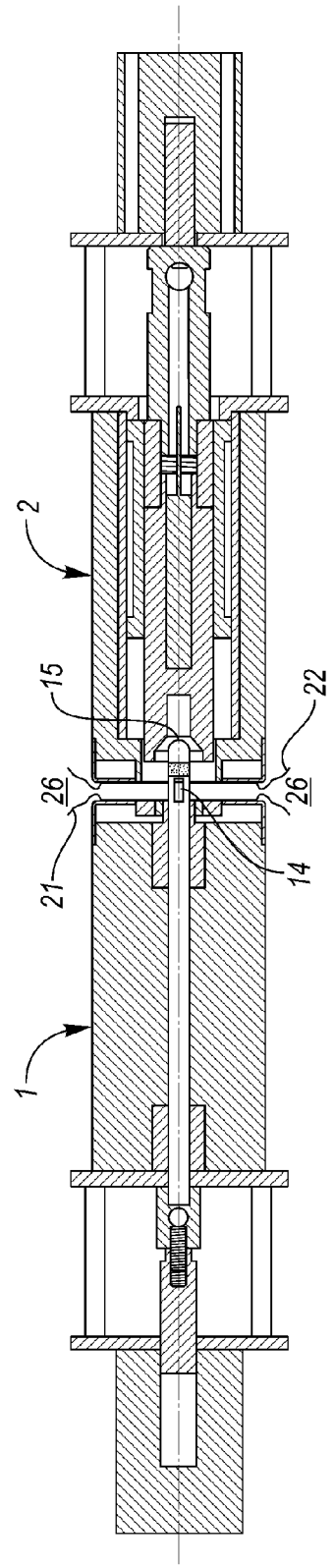

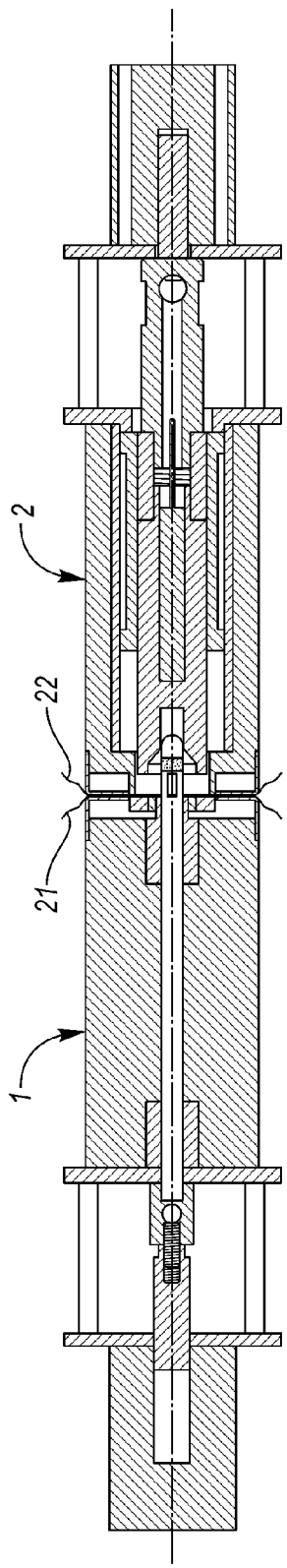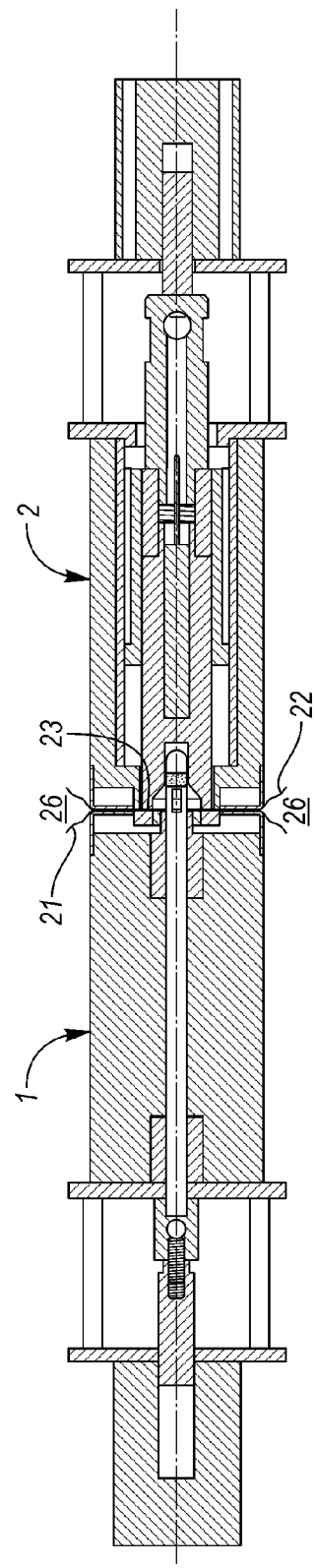

though the jaws 1 and 2 are separated (see FIG. 6).

MACHINE FOR AUTOMATICALLY FILLING-INFLATING GAS CUSHIONS, NOTABLY AIR CUSHIONS, FOR PACKAGING AND USE THEREOF FOR FILLING AND INFLATING CUSHIONS

CROSS-REFERENCE TO RELATED APPLICATIONS

This application is a 371 U.S. National Stage of International Application No. PCT/CH2011/000253, filed on Oct. 21, 2011, which claims priority to Swiss Patent Application No. 1757/10, filed Oct. 25, 2010, the contents of which are hereby incorporated by reference in their entirety as if fully set forth herein.

The subject of the present invention is a machine for automatically inflating/filling gas cushions, notably air cushions, for packaging, and its use for inflating and filling cushions. Notably to protect delicate and fragile objects against impacts.

Currently, delicate and fragile objects are packaged in cardboard boxes containing particles of expanded polystyrene or shells of expanded polystyrene or other materials. These products generate a large volume of waste which must be destroyed after use. Air-filled cushions are also used for immobilizing objects in the cardboard boxes as a replacement for polystyrene particles. However, the cushions used for immobilizing do not sufficiently protect said objects against impacts. Air cushions have therefore been invented making it possible to surround said objects in one or more air cushions. The latter cushions comprise at least one valve allowing an appropriate inflation, that is to say an inflation of a pressure higher than those previously achieved for immobilization. Document EP 0553027 describes an inflatable cushion of the type defined above.

The inflatable cushions with valves have several drawbacks, notably the valve comprises the risk of leaks and of causing the pressure in the said cushion(s) to reduce, in addition manual inflating takes time.

The objects of the invention are to provide a machine for automatically inflating and filling cushions, notably air cushions, for packaging, and its use for inflating and filling cushions, that is to say a method which requires no human intervention and which does not have the drawbacks of the known methods.

These objects are achieved with the machine for automatically inflating and filling cushions with gas, notably air cushions, for packaging, according to the invention defined in claim 1 and its use defined in claim 4.

The invention will be better understood, its features and its advantages will appear more clearly, on reading the detailed description of forms of execution, given only as an example and made with reference to the appended drawings, in which:

FIG. 1 represents a form of execution of the jaws of a machine according to the invention.

FIG. 2 represents the jaws of FIG. 1 clamping the walls, plastic film, of an uninflated cushion.

FIG. 3 represents the jaws of FIG. 1 during the piercing of the walls.

FIG. 4 represents the jaws of FIG. 1 separated at the time of a first jet of air being used to unstick the two walls of plastic film.

FIG. 5 represents the jaws of FIG. 1 separated, allowing the cushion to be inflated.

FIG. 6 represents the jaws of FIG. 1 separated at the time of inflation of the cushion.

FIG. 7 represents the jaws of FIG. 1 clamping the walls of the inflated cushion.

FIG. 8 represents the jaws of FIG. 1 at the time of the heat-sealing of the walls.

In all of the figures, the same reference symbols will be used to indicate the same features.

Figure 9:
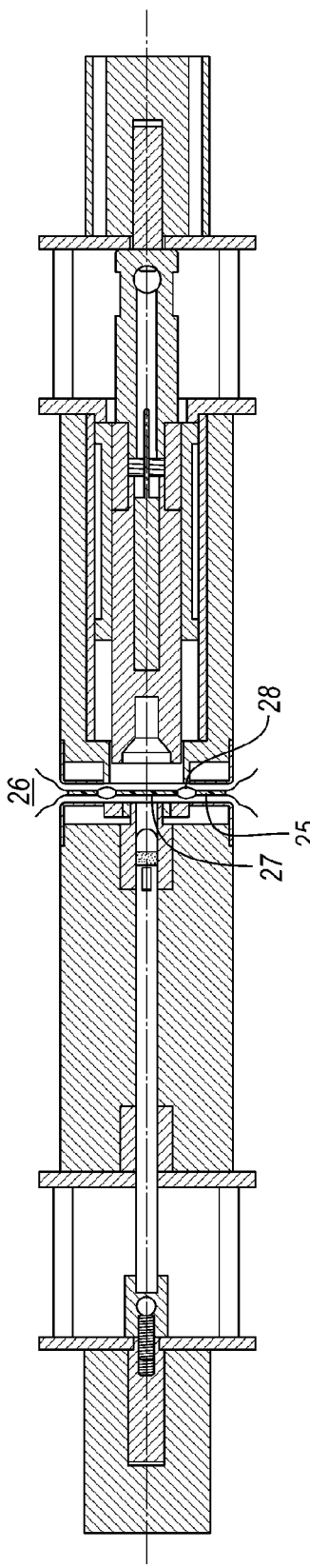
FIG. 9 represents the jaws of FIG. 1 separated at the time of the release of the cushion from the machine.

With reference to FIGS. 1 to 9, only the jaws of one machine have been shown, according to a form of execution of the present invention, for the inflation and filling of an air cushion, because all the other elements of the machine are known and within the scope of those skilled in the art. It has also been considered that the two walls of a cushion consist of two sheets of plastic film.

As can be seen in FIG. 1, the two jaws 1 and 2 are mounted on the frame, not shown, of a machine according to the present invention. The jaw 1, mounted movably on the frame of the machine, consists of a cylinder 3, inside which a hollow needle 5 is placed that can move in the direction of the axis of the cylinder 3. Said needle 5 is moved, in the case shown, by a piston 9, but it could also be moved by an electromagnet or any other means. Between the needle 5 and the piston 9 a flexible pipe 8 is provided carrying pressurized air to the inside of the needle 5. The distal end of the needle has a point 15 of which the air outlet is obstructed, while behind the point 15 the needle comprises by two (or a different number) lateral openings 14, designed to inject the air into the cushion (see FIG. 5). The jaw 2 consists of a cylinder 11 retained movably on the frame, not shown. The cylinders 3 and 11 can move longitudinally so that their terminal faces 4 and 10 can come into contact (see FIG. 2). The cylinder 11 contains a cylindrical part 17 concentric with the cylinder 11. Inside said part 17 an electrical heating body 18 is placed powered by an electrical cable 19. At its near end of the cylinder 3 the cylinder 11 has a cavity 16 designed to receive the point 15 of the needle 5. The two ends of the cylinders 3 and 11 face to face have a ring of openings in communication with an aspiration/suction device respectively through aspiration channels 6 and 7 placed in the cylinders 3 and 11.

A use of a machine according to the invention defined in claim 2 proceeds in the following manner:

a) the two walls 21 and 22 of a cushion, uninflated, of any shape, for example square, round, having several pockets connected together, are inserted between the jaws 3 and 11 of the machine as shown in FIG. 1.

b) The two jaws 1 and 2 are moved so as to clamp between their terminal faces 4 and 10 the two sheets of plastic forming the walls of the cushion (see FIG. 2).

c) The needle 5 of the jaw 1 is moved longitudinally perforating the two walls 21 and 22 and placing itself in the cavity 16 of the jaw 2 (see FIG. 3).

d) The two jaws 1 and 2 are moved away slightly and a jet of pressurized air is injected through the lateral openings 14 of the needle 5 so as to unstick the two films 21 and 22 forming the walls of the cushion (see FIG. 4).

e) The two jaws are reclamped, then the aspiration device is activated in the channels 6 and 7, placed in rings about openings allowing the needle to pass, and keep the two walls 21 and 22 stuck to the ends of the cylinders 3 and 11. The pressurized air is injected into the cushion through the openings 14 inflating the latter (see FIGS. 5 and 6).

f) The jaws 1 and 2 are brought together clamping the two walls 21 and 22 between them while compressing the air contained in the cushion (see FIG. 7).

g) The cylinder 17 contained in the body 11 of the jaw 2 is moved so as to press on the periphery of the outlet orifice of the needle 5 of the body 3. The heating element 18 is activated, heat-sealing the two walls along a ring surrounding the hole of the needle 5 preventing the air from leaving the cushion (see FIG. 8).

As can be easily seen in FIG. 8, the surface area of contact between the two jaws 1 and 2 is larger than the heat-sealed zone, therefore, when the jaws are separated to release the cushion from the machine, the zone 23 represents a ring where the two walls are not stuck, and will be separated from one another thus causing a reduction of the pressure in the cushion.

Figure 10:
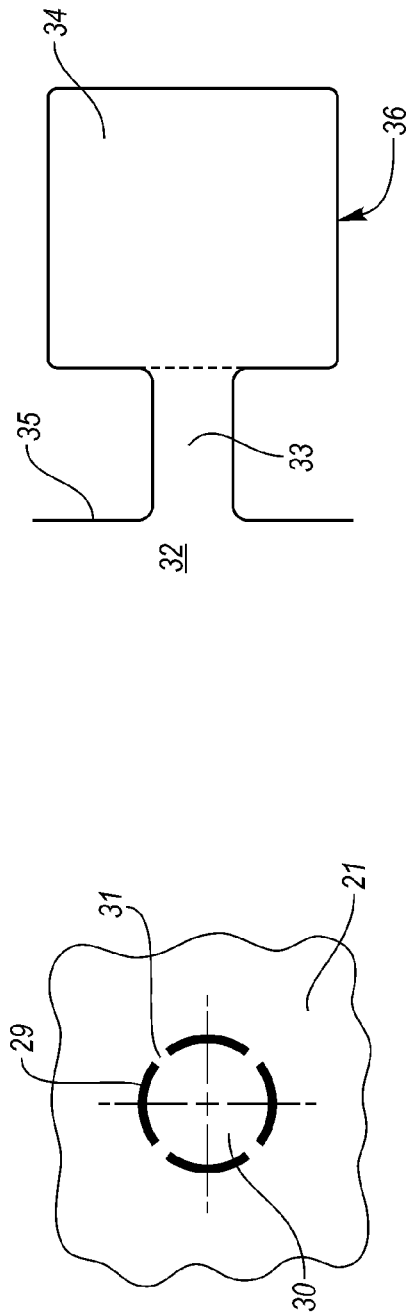
FIG. 10 represents on a cushion a circular space defined by a discontinuous weld.

In order to remedy this defect, provision has been made in another form of execution of the use of the machine to provide cushions having at least one location where the two walls are partly heat-sealed defining a space in communication with the rest of the volume included between the two walls. As is seen in FIG. 10, this space is circular, defined by circularly arcuate welds. But this space could have another shape, for example polygonal, square, triangular, the only condition being that the weld line is not continuous so as to remain in communication with the rest of the volume included between the two walls.

FIG. 9 shows the two jaws separated releasing a cushion from the machine, which cushion is inflated according to the last use described above. Note that the heat-sealed zone 27 where the two walls are welded comprises on its periphery a taurus-shaped zone 28 having zones 25, 29 in FIG. 10 where the two walls are welded, the zones 25, respectively 29 (see FIG. 10) are not continuous, hence the inside of the taurus is at the same pressure as the inside 26 of the cushion. In other words, the two walls in the welding zone are able to separate only slightly, which causes only a very slight loss of pressure in the cushion.

In another form of execution of the use of a machine according to the invention, cushions are used that consist of two walls (plastic films) defining a closed space trapping a small quantity of air preventing the two walls from sticking. The latter operation having been carried out previously before entering the machine according to the invention, for example on another machine, known to those skilled in the art. The use proceeds in the following manner:

A) The two walls of a cushion having two walls that are not stuck together are positioned.

B) The two jaws are moved so as to clamp between their terminal faces the two sheets of plastic forming the walls of the cushion.

C) The aspiration device is activated in the channels placed in rings on the terminal faces of the two bodies forming the jaws. The two walls are then kept separated, stuck against said faces.

D) A needle contained in the body of the machine having an opening at its point and moved so as to pierce only the first wall while leaving the other intact.

E) The pressurized air is injected into the cushion inflating the latter.

F) The jaws are brought together clamping the two walls between them while compressing the air contained in the cushion.

G) In the same manner as in the use described above, the cylinder 17 contained in the body 11 of the jaw 2 is moved so as to press on the periphery of the orifice for the needle 5 to exit the body 3. The heating element is activated heat-sealing the two walls along a ring surrounding the hole of the needle preventing the air from leaving the cushion. And the use (method) ends like that previously described with respect to FIG. 9.

In yet another form of execution of a machine according to the invention for inflating cushions, on which a hole has already been made in at least one of the walls, the use will proceed in the following manner:

A) The two walls of a cushion are placed between the jaws so that the hole is placed opposite the outlet orifice of the needle in the face of one of the bodies.

B) The suction device is actuated, the two jaws are separated each keeping one of the walls stuck against them.

D) The pressurized gas is then injected into the cushion through the outlet orifice of the needle provided in the terminal face of one of the jaws without the needle being moved.

The rest of the process then unfolds as described above.

Figure 11:
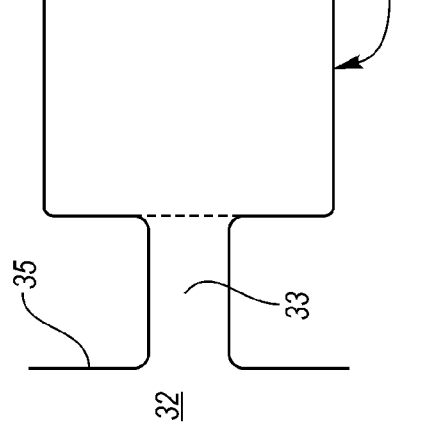
FIG. 11 represents a protuberance relating to a particular shape of a cushion.

It is also possible to design variants of use in which the cushion is pierced in any location, for example in a corner, or in which the cushion has a protuberance 36 (see FIG. 11) relative to its general shape, the inside 34 of said protuberance being connected to its general volume 36 of said cushion by a duct 33 that will be closed by heat-sealing 37. As can be seen in FIG. 11, a protuberance 36 is attached to the general volume 32 of a cushion by a duct 33, the two films forming the cushion being welded along the line 35.

As can be seen, all the operations described above require no human intervention. Moreover, it is possible to inflate cushions to a higher pressure than by the methods known hitherto. Finally, the piercing can be carried out at any location on the cushion, for example in a corner, in the middle, at an edge, and it is possible to inflate any shape of cushion, even having several pockets communicating with one another. The cushions obtained by a method according to the invention are more inflated, hence more rigid and can, in certain cases, replace the polystyrene shells. The inflation pressure may vary depending on the strength and the thickness of the sheets forming the walls.

The invention claimed is:

1. A cushion inflator comprising:
a first jaw having a cylinder, a needle disposed within the cylinder and axially movable relative to the cylinder, and a first aspiration channel disposed within the first jaw adjacent to a first terminal face of the first jaw; and
a second jaw having a cavity aligned to receive at least a portion of the needle, a heating element disposed within the second jaw and axially movable relative to a second terminal face of the second jaw, and a second aspiration channel disposed within the second jaw adjacent to the second terminal face of the second jaw.

2. The cushion inflator of claim 1, wherein the needle is a hollow needle connected at a first end to a source of pressurized gas, and wherein the needle has at least one opening in proximity to a second end to inject pressurized gas into a cushion.

3. The cushion inflator of claim 2, wherein the second end of the needle is axially movable from a retracted position within the cylinder to an extended position outside of the cylinder.

4. The cushion inflator of claim 1, wherein the first terminal face defines a first plurality of openings disposed annularly around the needle and in fluid communication with the first aspiration channel, and wherein the second terminal face defines a second plurality of openings disposed annularly around the heating element and in fluid communication with the second aspiration channel.

5. The cushion inflator of claim 1, wherein the heating element includes a ring-shaped surface for forming a ring-shaped weld around the needle when the needle is received in the cavity.

6. The cushion inflator of claim 5, wherein ring-shaped surface of the heating element forms the ring-shaped weld within a discontinuous weld zone of a cushion.

* * * * *